US012053424B2

(12) United States Patent
Kang et al.

(10) Patent No.: US 12,053,424 B2
(45) Date of Patent: Aug. 6, 2024

(54) MASSAGE DEVICE HAVING ERECTABLE STRUCTURE

(71) Applicant: BODYFRIEND CO., LTD., Seoul (KR)

(72) Inventors: Woong Chul Kang, Gyeonggi-do (KR); Ho Soo Kim, Seoul (KR)

(73) Assignee: BODYFRIEND CO., LTD., Seoul (KR)

(*) Notice: Subject to any disclaimer, the term of this patent is extended or adjusted under 35 U.S.C. 154(b) by 825 days.

(21) Appl. No.: 17/258,347

(22) PCT Filed: Jul. 8, 2019

(86) PCT No.: PCT/KR2019/008333
§ 371 (c)(1),
(2) Date: Jan. 6, 2021

(87) PCT Pub. No.: WO2020/013539
PCT Pub. Date: Jan. 16, 2020

(65) Prior Publication Data

US 2021/0290480 A1 Sep. 23, 2021

(30) Foreign Application Priority Data

Jul. 9, 2018 (KR) ........................ 10-2018-0079361

(51) Int. Cl.
*A47C 1/032* (2006.01)
*A61G 5/14* (2006.01)
*A61H 15/00* (2006.01)

(52) U.S. Cl.
CPC ...... *A61H 15/0078* (2013.01); *A47C 1/03211* (2013.01); *A61G 5/14* (2013.01);
(Continued)

(58) Field of Classification Search
CPC .............................. A61G 5/14; A47C 1/03211
See application file for complete search history.

(56) References Cited

U.S. PATENT DOCUMENTS 3,851,917 A * 12/1974 Horstmann .............. A61G 5/14 297/DIG. 10
5,011,224 A * 4/1991 Paul ......................... A61G 5/14 297/DIG. 10
(Continued)

FOREIGN PATENT DOCUMENTS

CN 106344294 A * 1/2017
CN 111956409 A * 11/2020
(Continued)

*Primary Examiner* — Timothy J Brindley
(74) *Attorney, Agent, or Firm* — Bridgeway IP Law Group, PLLC; Sang Ho Lee; Hyun Woo Shin

(57) ABSTRACT

Disclosed herein is a massage device having a shape-changeable structure. According to an embodiment of the present disclosure, there is disclosed a massage device including a seat frame configured to support buttocks of a user, a link frame of which one end is connected to one end of the seat frame, and a link sub-frame connected to the other end of the link frame and disposed between the link frame and a driving force providing part, wherein an angle between the link frame and the seat frame is maintained at a predetermined angle, and an angle between the link frame and the link sub-frame changes according to the movement of the driving force providing part.

16 Claims, 12 Drawing Sheets

(52) U.S. Cl.
CPC ................ *A61H 2201/0149* (2013.01); *A61H 2201/1623* (2013.01); *A61H 2201/1633* (2013.01); *A61H 2203/0425* (2013.01)

(56) References Cited

U.S. PATENT DOCUMENTS

| | | | | |
|---|---|---|---|---|
| 5,294,179 | A * | 3/1994 | Rudes | A61G 5/14 297/DIG. 10 |
| 5,316,370 | A * | 5/1994 | Newman | A61G 5/14 297/DIG. 10 |
| 5,518,296 | A * | 5/1996 | Compardo | A47C 1/12 297/DIG. 2 |
| 6,189,164 | B1 * | 2/2001 | Krapu | A61G 5/14 297/DIG. 10 |
| 6,360,382 | B1 * | 3/2002 | Karash | A61G 7/1017 4/667 |
| 8,556,347 | B2 * | 10/2013 | Lin | A61G 5/14 297/DIG. 10 |
| 10,322,044 | B2 * | 6/2019 | Upchurch | A61G 5/1059 |
| 2010/0295356 | A1 * | 11/2010 | Chen | B60N 2/245 297/378.1 |
| 2011/0084529 | A1 * | 4/2011 | Huang | A61G 5/14 297/330 |
| 2015/0051525 | A1 | 2/2015 | Wang et al. | |
| 2015/0208805 | A1 * | 7/2015 | Griggs, Jr. | A47C 1/03222 74/89 |
| 2017/0164743 | A1 * | 6/2017 | Head, Jr. | A47C 7/543 |
| 2018/0078816 | A1 * | 3/2018 | Su | A63B 22/001 |

FOREIGN PATENT DOCUMENTS

| | | | | |
|---|---|---|---|---|
| CN | 113317938 | A * | 8/2021 | A61G 5/006 |
| DE | 102006011710 | B3 * | 8/2007 | A61G 5/006 |
| DE | 202010005963 | U1 * | 9/2010 | A47C 1/029 |
| DE | 202019100213 | U1 * | 3/2019 | A47C 1/0242 |
| EP | 2374438 | A1 * | 10/2011 | A61G 5/14 |
| FR | 2724299 | A1 * | 3/1996 | A61G 5/14 |
| GB | 2591807 | A * | 8/2021 | A47B 27/14 |
| JP | 4037674 | B2 | 1/2008 | |
| JP | 2014-042812 | A | 3/2014 | |
| JP | 2016-013237 | A | 1/2016 | |
| KR | 10-1144812 | B1 | 5/2012 | |
| KR | 10-1189364 | B1 | 10/2012 | |
| KR | 10-1734071 | B1 | 5/2017 | |
| WO | WO-2020088552 | A1 * | 5/2020 | A47C 1/02 |

* cited by examiner

MASSAGE DEVICE HAVING ERECTABLE STRUCTURE

TECHNICAL FIELD

The present disclosure relates to a massage device having an erectable structure.

BACKGROUND ART

A massage is an adjuvant therapy in which mechanical stimuli in various forms are applied to a part of a subject's body by rubbing, pressing, pulling, tapping, or moving the part of the body to adjust modulation of the subject's body, aid circulation, and relieve the subject's fatigue.

For economic and time reasons, an increase in demand for massages has caused an increase in demand for massage apparatuses or massage devices that provide artificial massage functions. That is, with an increase in demand to relieve fatigue or stress by relaxing tight muscles through massage, various massage devices which are efficient in terms of time and cost have been launched. Tools, devices, or apparatuses in any form that perform massage through mechanical devices without a massager are referred to as massage devices.

In recent years, with an increase in people's interest in health, the size of the massage device market has increased. Accordingly, massage devices of various concepts have been released, and research on functions and structures of massage devices has been continuously carried out.

A massage device is disclosed in Korean Patent Registration No. 10-1189364.

DISCLOSURE

Technical Problem

One objective of the present disclosure is to provide an erectable massage device.

Another objective of the present disclosure is to provide a massage device that is able to be transformed from a standing type to a seating type and from the seating type to the standing type.

Technical Solution

According to an embodiment of the present disclosure, there is provided a massage device including a seat frame configured to support buttocks of a user, a link frame of which one end is connected to one end of the seat frame, and a link sub-frame connected to the other end of the link frame and disposed between the link frame and a driving force providing part, wherein an angle between the link frame and the seat frame is maintained at a predetermined angle, and an angle between the link frame and the link sub-frame changes according to the movement of the driving force providing part.

Advantageous Effects

According to an embodiment of the present disclosure, it is possible to provide a massage device that is able to be transformed from a standing type to a seating type and from the seating type to the standing type.

DESCRIPTION OF DRAWINGS

Various aspects will be described below with reference to the drawings. Here, similar reference numerals will be used to refer to substantially similar elements. In the following embodiments, for the sake of description, a plurality of specific details will be proposed to provide overall understanding of one or more aspects. However, it is apparent that the aspect(s) may be embodied without the specific details. In other examples, known structures and devices are illustrated as block diagrams to facilitate description of one or more aspects.

MODES OF THE INVENTION

The objects, features, and advantages of the present disclosure described above will become more apparent through the following embodiments relating to the accompanying drawings. The following descriptions of specific structures or functions are only given to describe embodiments according to the concept of the present disclosure. The embodiments according to the concept of the present disclosure may be embodied in various forms, and the present disclosure should not be interpreted as being limited by the embodiments described in the present specification or application.

In the present specification, an actuator refers to an element capable of providing a driving force. Examples of the actuator may include a motor, a linear motor, an electronic motor, a DC motor, an AC motor, a linear actuator, an electric actuator, and the like, but the present disclosure is not limited thereto.

In the present specification, a spiral rod refers to a linear member having a spiral groove and may be implemented with a metal material. Examples of the spiral rod may include a cylindrical bar having a spiral groove formed in a surface thereof. Examples of the spiral rod may also include a metal lead screw, but the present disclosure is not limited thereto.

According to an embodiment of the present disclosure, a massage device may refer to a massage device including a body massage part and a leg massage part.

Also, according to another embodiment, a body massage part and a leg massage part may be present as separate devices (for example, a body massage device and a leg massage device), and a massage device may refer to the body massage device or the leg massage device.

Hereinafter, embodiments of the present disclosure will be described in more detail with reference to the accompanying drawings.

Figure 1:
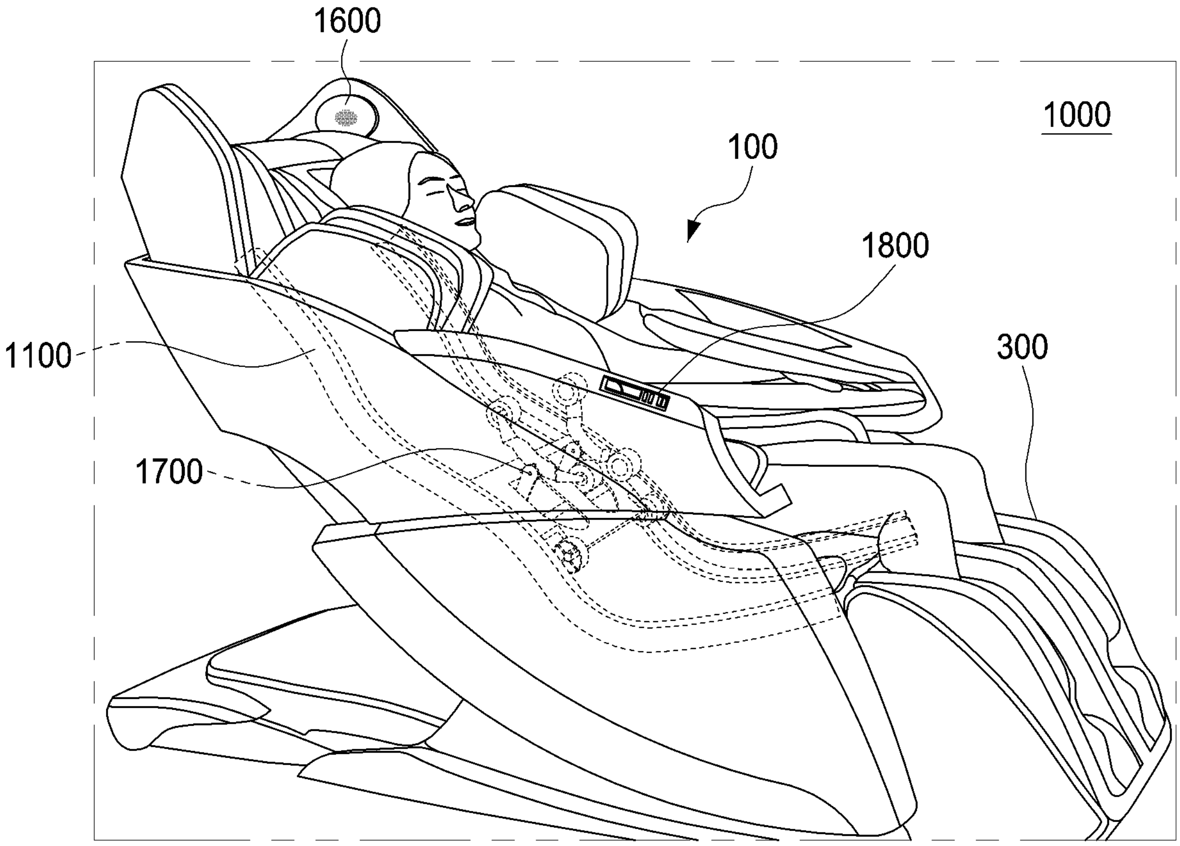
FIG. 1 is a view for describing a massage device (1000) according to an embodiment of the present disclosure.

FIG. 1 is a view for describing a massage device 1000 according to an embodiment of the present disclosure.

The massage device 1000 according to an embodiment of the present disclosure may include a body massage part 100 that has an area formed to accommodate at least a portion of a user's body and that is configured to massage the user's torso and a leg massage part 300 configured to massage the user's legs.

The body massage part 100 may provide a massage to at least a portion of the user's body. The body massage part 100 may include a massage module 1700 configured to provide a massage function to at least a portion of the user's body, an audio output module 1600 configured to provide an audio output in an arbitrary form to the user, a main frame 1100 constituting a framework of the body massage part 100, and a user input part 1800 configured to receive an input in an arbitrary form from the user.

The above-described elements that the body massage part 100 includes are merely an exemplary embodiment, and the body massage part 100 may include various elements other than those described above.

Also, the shape and structure of the massage device 1000 illustrated in FIG. 1 are merely illustrative, and a massage device 1000 having various other forms may also fall within the scope of the present disclosure unless the form of the massage device 1000 deviates from the scope defined by the claims of the present disclosure.

The body massage part 100 may have a space formed in an arbitrary shape to accommodate a user. The body massage part 100 may have a space formed in a shape that corresponds to a shape of the user's body. For example, as illustrated in FIG. 1, the body massage part 100 may be implemented as a seating type and may accommodate the entire body of the user or a portion of the body.

A portion of the body massage part 100 that comes in contact with the ground may include an arbitrary material configured to increase a frictional force or an arbitrary member configured to increase a frictional force (e.g., a nonslip pad etc.) and may include a wheel configured to reinforce the mobility of the massage device 1000.

The body massage part 100 may include a head contact part configured to come in contact with the user's head, a back contact part configured to come in contact with the user's back, a buttocks contact part configured to come in contact with the user's buttocks, and arm massage parts configured to accommodate the user's arms, but the present disclosure is not limited thereto, and the body massage part 100 may include user contact parts having various other forms.

At least a portion of the body massage part 100 may be able to slide. For example, in the case in which the body massage part 100 begins to perform a massage, at least a portion of the body massage part 100 may slide forward. Also, the body massage part 100 may be reclined. As a result, the body massage part 100 may provide a massage while reclined.

According to an embodiment of the present disclosure, the massage device 1000 may include at least one air cell (not illustrated). The air cell may be located at portions of the massage device 1000 that correspond to the user's shoulders and pelvis, the arm massage parts, the leg massage part 300, and the like, but the present disclosure is not limited thereto, and the air cell may be disposed at various other portions of the massage device 1000.

The massage device 1000 may include an air supply part. The air supply part may supply air to the air cell to inflate the air cell. The air supply part may be located inside the body massage part 100 or located at the leg massage part 300. Also, the air supply part may be located outside the massage device 1000.

The leg massage part 300 may provide a leg massage to the user. For example, the leg massage part 300 may include a calf massage part configured to massage a user's calf and/or a foot massage part configured to massage a user's foot.

A length of the leg massage part 300 may be adjustable according to characteristics of the user's body. For example, in a case in which a tall user uses the massage device 1000, since the length of the user's calf is long, it is necessary to increase the length of the leg massage part 300. Also, in a case in which a short user uses the massage device 1000, since the length of the user's calf is short, it is necessary to decrease the length of the leg massage part 300. Accordingly, the leg massage part 300 may provide a leg massage that is customized to a height of the user.

The massage module 1700 may be disposed inside the body massage part 100 so as to provide mechanical stimuli in arbitrary forms to a user accommodated in the body massage part 100. As illustrated in FIG. 1, the massage module 1700 may move along the main frame 1100 disposed inside the body massage part 100.

For example, a rack gear may be disposed at the main frame 1100 of the body massage part 100, and the massage module 1700 may, while moving along the rack gear, provide mechanical stimuli to various parts of the user's body. The massage module 1700 may include a ball massage unit or a roller massage unit, but the present disclosure is not limited thereto.

The main frame 1100 constitutes a framework of an internal configuration of the body massage part 100 and may be implemented with a metal material, a plastic material, or the like. For example, the main frame 1100 may be implemented with iron, alloys, steel, and the like, but the present disclosure is not limited thereto, and the main frame 1100 may also be implemented with various other rigid materials.

According to an embodiment of the present disclosure, the massage device 1000 may include the audio output module 1600. The audio output module 1600 may be disposed at various locations. For example, the audio output module 1600 may include a plurality of output units such as an upper-end audio output unit disposed at an upper end of a seat part coming in contact with the user, a front audio output unit attached to front ends of the arm massage parts at the left and right sides of the seat part, and/or a rear audio output unit attached to rear ends of the arm massage parts, but the present disclosure is not limited thereto. In this case, the audio output module 1600 may provide stereophonic sound such as 5.1 surround sound, but the present disclosure is not limited thereto.

According to an embodiment of the present disclosure, the massage device 1000 may be implemented to have a standing-type structure. For example, the massage device 1000 may be operated as a standing type, and a user may also stand to ride on the massage device 1000. Also, when the user is on the massage device 1000, the massage device 1000 may be transformed from the standing type to the seating type.

Hereinafter, a structure of the standing-type massage device 1000 will be described in detail.

Figure 2:
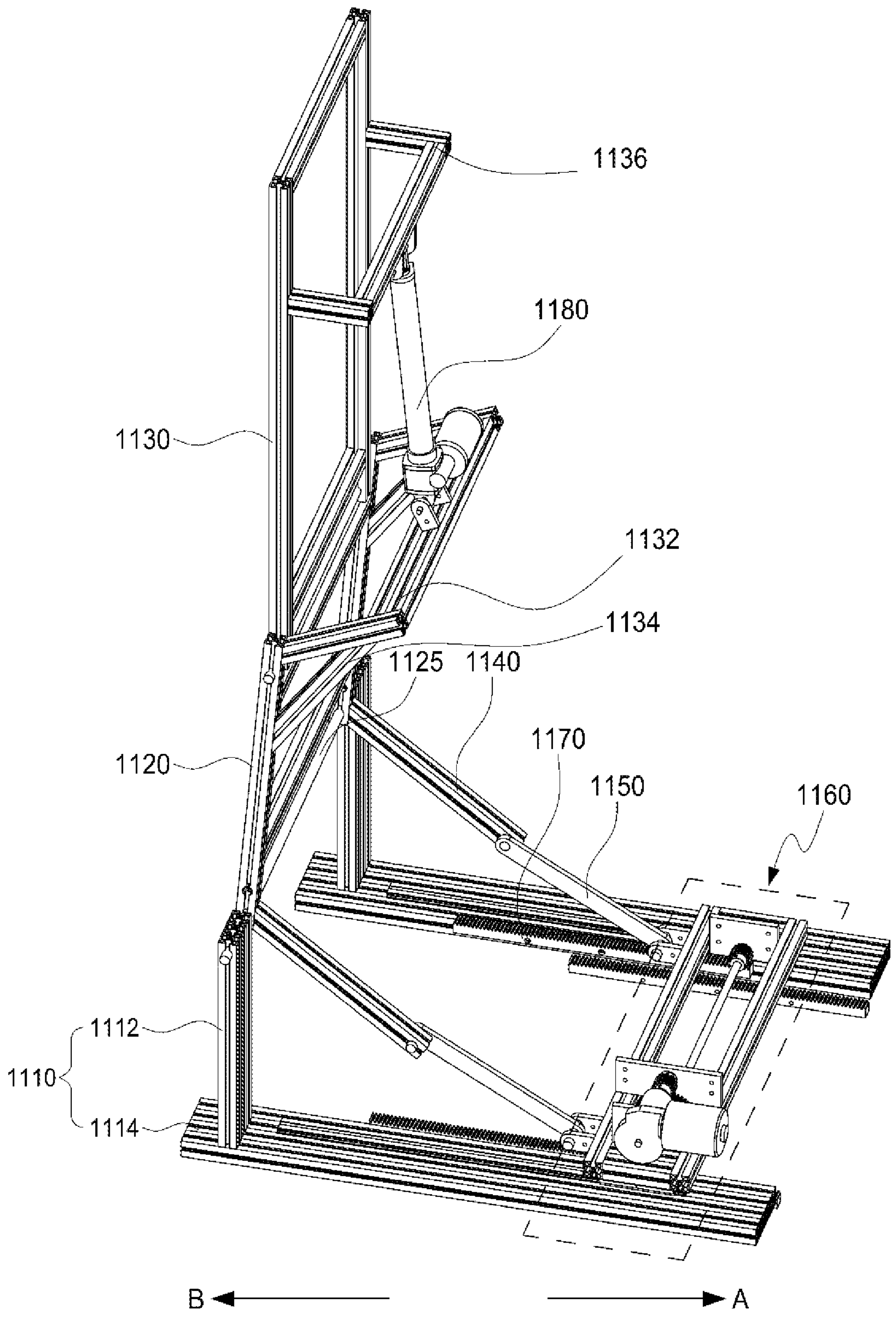
FIGS. 2 and 3 are views for describing a structure and operation of a main frame according to an embodiment of the present disclosure.
Figure 3:
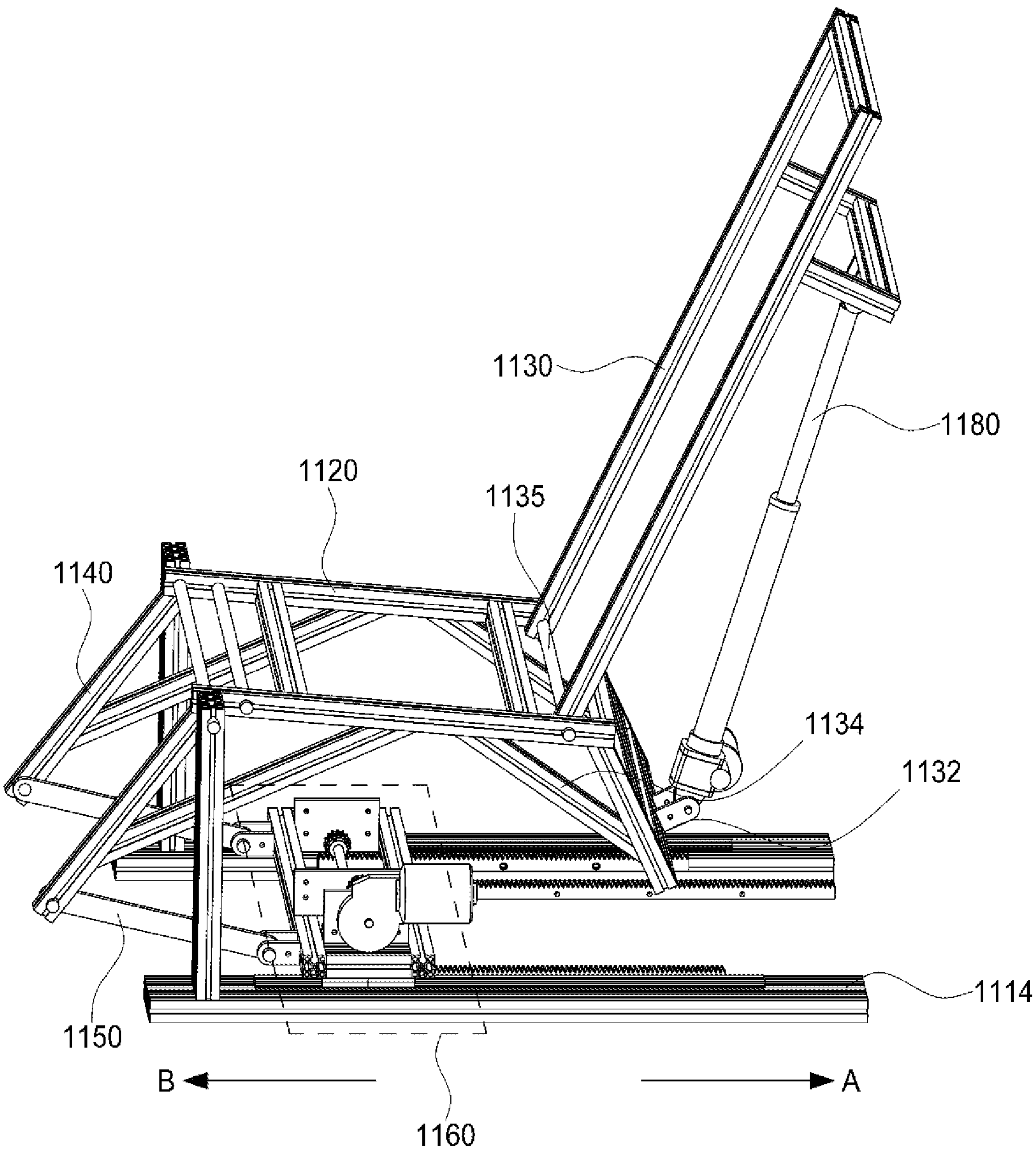

FIGS. 2 and 3 are views for describing a structure and operation of the main frame of the massage device according to an embodiment of the present disclosure.

FIG. 2 is a view for describing a structure of the main frame 1100 when the massage device 1000 is a standing type, and FIG. 3 is a view for describing a structure of the main frame 1100 when the massage device 1000 is a seating type.

According to an embodiment of the present disclosure, the main frame 1000 may include an upper frame and a base frame 1110. The upper frame may include at least one of a backrest frame 1130 configured to support the user's back, a seat frame 1120 configured to support the user's buttocks, a link frame 1140 that is connected to one end of the seat frame 1120 and is at a predetermined angle with the seat frame 1120, and a link sub-frame 1150 configured to transmit a driving force.

The seat frame 1120 refers to a frame that supports the user's buttocks when the user is on the massage device 1000 and may include a plurality of frames. For example, the seat frame 1120 may include at least one longitudinal frame and at least one widthwise frame and may support the user's buttocks when the user is on the massage device 1000. The seat frame 1120 may be implemented with a rigid material. For example, the seat frame 1120 may be implemented with iron, carbon, aluminum, and the like, but the present disclosure is not limited thereto, and the seat frame 1120 may also be implemented with various other rigid materials.

The backrest frame 1130 refers to a frame that supports the user's back when the user is on the massage device 1000 and may include a plurality of frames. For example, the backrest frame may include at least one longitudinal frame and at least one widthwise frame. The backrest frame 1130 may be implemented with a rigid material. For example, the backrest frame 1130 may be implemented with iron, carbon, aluminum, and the like, but the present disclosure is not limited thereto, and the backrest frame 1130 may also be implemented with various other rigid materials.

The backrest frame 1130 may be connected to one side of the seat frame 1120. For example, a sub-rotating shaft 1135 may be provided at one side of the seat frame 1120, and the backrest frame 1130 may be connected to the sub-rotating shaft 1135 and rotate about the sub-rotating shaft 1135. As the backrest frame 1130 rotates, an angle between the seat frame 1120 and the backrest frame 1130 may change.

For example, the massage device 1000 may include a first back angle auxiliary frame 1132 that is disposed at one side of the seat frame 1120 and configured to maintain a predetermined angle with the seat frame 1120. Also, a second back angle auxiliary frame 1136 (for example, implemented in a c-shape) may be provided on at least a portion of the seat frame 1120. A back angle actuator 1180 may be disposed on the first back angle auxiliary frame 1132 and the second back angle auxiliary frame 1136, and thus, the angle between the seat frame 1120 and the backrest frame 1130 may be changed due to operation of the back angle actuator 1180.

Specifically, when the back angle actuator 1180 is driven from a short state to a long state, the back angle actuator 1180 may apply a pushing force to the second back angle auxiliary frame 1136, and as a result, the backrest frame 1130 may rotate in a first direction (for example, counterclockwise) about the sub-rotating shaft, and thus, the angle between the seat frame 1120 and the backrest frame 1130 may be decreased.

Also, when the back angle actuator 1180 is driven from the long state to the short state, the back angle actuator 1180 may apply a pulling force to the second back angle auxiliary frame 1136, and as a result, the backrest frame 1130 may rotate in a second direction (for example, clockwise) about the sub-rotating shaft, and thus, the angle between the seat frame 1120 and the backrest frame 1130 may be increased.

According to an embodiment of the present disclosure, a back angle support frame 1134 may be provided between the seat frame 1120 and the first back angle auxiliary frame 1132. The back angle support frame 1134 may help maintain the angle between the seat frame 1120 and the first back angle auxiliary frame 1132.

The link frame 1140 may be provided at one side of the seat frame 1120. The link frame 1140 may be provided to maintain a predetermined angle with the seat frame 1120. For example, one side of the link frame 1140 may be coupled to one side of the seat frame 1120 while a predetermined angle is maintained therebetween. In this case, a main rotating shaft 1125 may be provided on at least a portion of the seat frame 1120 or the link frame 1140, and the seat frame 1120 and the link frame 1140 may rotate about the main rotating shaft 1125 while the predetermined angle is maintained.

The link frame 1140 may include at least one frame and may be implemented with a rigid material. For example, the link frame 1140 may be implemented with iron, carbon, aluminum, and the like, but the present disclosure is not limited thereto, and the link frame 1140 may also be implemented with various other rigid materials.

One end of the link frame 1140 may be connected to the link sub-frame 1150. For example, one end of the link frame 1140 and one end of the link sub-frame 1150 may be coupled so as to be rotatable relative to each other, and as the link sub-frame 1150 pulls one end of the link frame 1140, the seat frame 1120 may rotate to become the standing type.

For example, when the link sub-frame 1150 pulls the one end of the link frame 1140, the link frame 1140 may rotate in the first direction (for example, counterclockwise) about the main rotating shaft 1125. In this case, due to the rotation of the link frame 1140, the seat frame 1120 coupled to the link frame 1140 at a predetermined angle may rotate to become the standing type. Also, when the link sub-frame 1150 pushes the one end of the link frame 1140, the link frame 1140 may rotate in the second direction (for example, clockwise) about the main rotating shaft 1125. In this case, due to the rotation of the link frame 1140, the seat frame 1120 coupled to the link frame 1140 at a predetermined angle may rotate to become seating-type.

Since one end of the link sub-frame 1150 may be connected to the link frame 1140 and the other end of the link sub-frame 1150 may be connected to a driving force providing part 1160, the link sub-frame 1150 may pull or push the link frame 1140 due to the movement of the driving force providing part 1160.

Referring to FIGS. 2 and 3, when the driving force providing part 1160 moves rearward (A), the link sub-frame 1150 may pull the link frame 1140. In this case, since the link frame 1140 may rotate in the first direction (for example, counterclockwise) about the main rotating shaft 1125, the seat frame 1120 coupled to the link frame 1140 at a predetermined angle may rotate to become the standing type.

Referring to FIGS. 2 and 3, when the driving force providing part 1160 moves forward (B), the link sub-frame 1150 may push the link frame 1140. In this case, since the link frame 1140 may rotate in the second direction (for example, clockwise) about the main rotating shaft, the seat frame 1120 coupled to the link frame 1140 at a predetermined angle may rotate to become seating-type.

According to an embodiment of the present disclosure, the back angle actuator 1180 may operate in conjunction with the driving force providing part 1160. For example, when the driving force providing part 1160 pulls the link sub-frame 1150 rearward (A), the length of the back angle actuator 1180 may shorten. As a result, the angle between the seat frame 1120 and the backrest frame 1130 may be increased, and the massage device 1000 may be transformed to the standing type.

Also, when the driving force providing part 1160 pushes the link sub-frame 1150 forward (B), the length of the back angle actuator 1180 may lengthen. As a result, the angle between the seat frame 1120 and the backrest frame 1130 may be decreased, and the massage device 1000 may be transformed to seating-type.

The driving force providing part 1160 may include an actuator configured to provide a driving force, at least one link gear connected to the actuator to change a magnitude of the driving force generated by the actuator, and at least one pinion gear connected to the at least one link gear. The driving force providing part 1160 will be described in more detail below with reference to FIGS. 5 and 6.

The base frame 1110 may come in contact with the ground and be connected to the seat frame 1120 to support the seat frame 1120. The base frame 1110 may include at least one frame. For example, the base frame 1110 may include a vertical base frame 1112 provided in a direction perpendicular to the ground to support the main rotating shaft 1125 and a horizontal base frame 1114 that supports the vertical base frame 1112 and comes in contact with the ground.

A rack gear 1170 may be provided on at least a portion of an upper surface of the horizontal base frame, and the driving force providing part 1160 may move along the rack gear 1170 to provide a driving force to the link sub-frame 1150.

Figure 4:
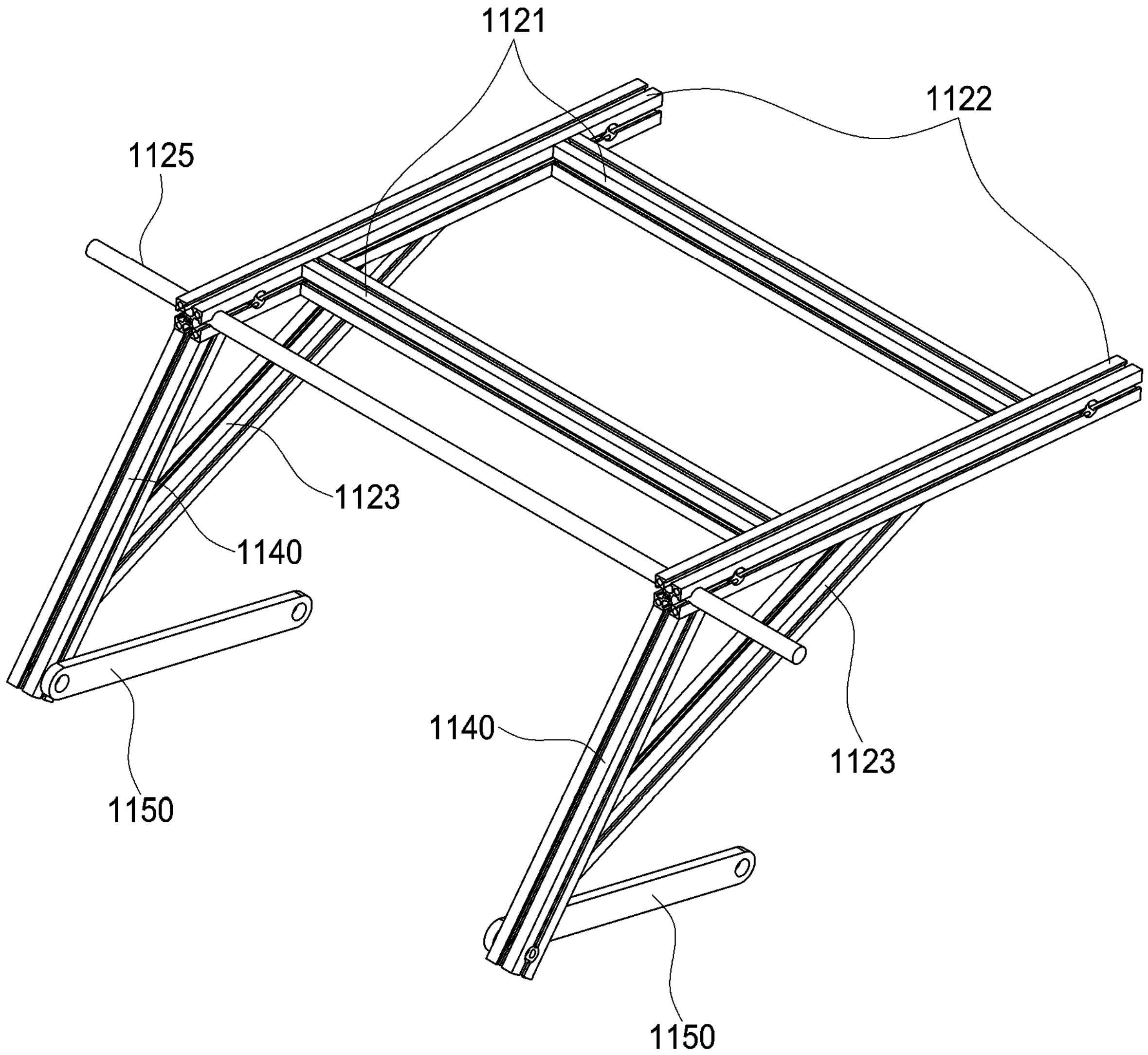
FIG. 4 is a view for describing a structure of a seat frame (1120) and a link frame (1140) according to an embodiment of the present disclosure.

FIG. 4 is a view for describing the structure of the seat frame 1120 and the link frame 1140 according to an embodiment of the present disclosure.

The seat frame 1120 may include a plurality of frames. For example, the seat frame 1120 may include longitudinal frames 1122 and widthwise frames 1121.

The seat frame 1120 may be connected to the link frame 1140. For example, the link frame 1140 may be coupled to the longitudinal frame 1122. In this case, the link frame 1140 and the longitudinal frame 1122 may maintain a predetermined angle therebetween.

Also, the main frame 1100 may further include a coupling support frame 1123 configured to support coupling between the link frame 1140 and the seat frame 1120. Since one end of the coupling support frame 1123 may be connected to the seat frame 1120 and the other end of the coupling support frame 1123 may be connected to the link frame 1140, the coupling support frame 1123 may support the coupling between the link frame 1140 and the seat frame 1120.

The link frame 1140 may be connected to the link sub-frame 1150. For example, one end of the link frame 1140 may be coupled to the seat frame 1120, and the other end of the link frame 1140 may be connected to the link sub-frame 1150. In this case, the angle between the link frame 1140 and the link sub-frame 1150 may change. For example, when the driving force providing part 1160 pulls the link sub-frame 1150, the angle between the link frame 1140 and the link sub-frame 1150 may be increased. Also, when the driving force providing part 1160 pushes the link sub-frame 1150, the angle between the link frame 1140 and the link sub-frame 1150 may be decreased.

Due to the connection structure between the seat frame 1120, the link frame 1140, and the link sub-frame 1150, the massage device 1000 may be transformed from a standing type to a seating type and from the seating type to the standing type.

For example, since the link frame 1140 and the link sub-frame 1150 are connected such that the angle between the link frame 1140 and the link sub-frame 1150 may be changed, the driving force provided by the driving force providing part 1160 may be efficiently transmitted to the link frame 1140. Also, since the angle between the link frame 1140 and the seat frame 1120 is maintained at a predetermined angle, the shape change (for example, from the standing type to the seating type or from the seating type to the standing type) of the massage device 1000 may be allowed.

Figure 5:
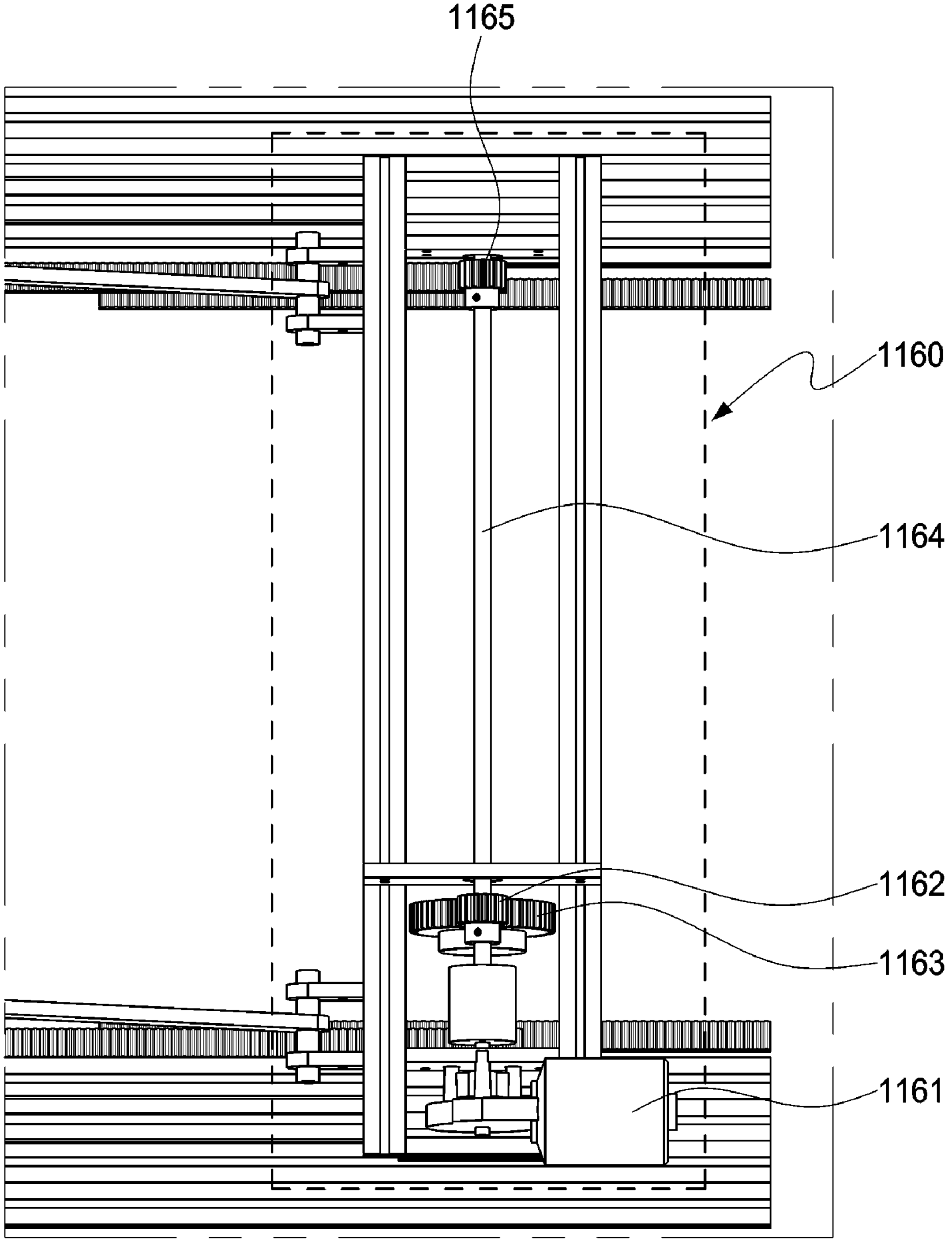
FIG. 5 is a view for describing a structure of a driving force providing part (1160) according to an embodiment of the present disclosure.

FIG. 5 is a view for describing the structure of the driving force providing part 1160 according to an embodiment of the present disclosure.

The driving force providing part 1160 may include an actuator 1161. In this case, the actuator may be implemented as a DC motor.

When the actuator 1161 is driven, a first link gear 1162 may rotate. The first link gear 1162 is a gear configured to rotate due to driving of the actuator 1161 and may rotate in a forward direction or a reverse direction according to a direction in which the actuator is driven.

The first link gear 1162 may be engaged with a second link gear 1163. The second link gear 1163 is a gear of which a diameter is larger than that of the first link gear 1162, and may increase the magnitude of force supplied by the actuator 1161.

Since the second link gear 1163 may be coupled to a gear connecting frame 1164, due to the rotation of the second link gear 1163, the gear connecting frame 1164 may also rotate.

A pinion gear 1165 may be provided at both ends of the gear connecting frame 1164. When the gear connecting frame 1164 rotates, the pinion gear 1165 at both ends of the gear connecting frame 1164 may also rotate, and due to the rotation of the pinion gear 1165, the pinion gear 1165 may move along the rack gear 1170, and thus the driving force providing part 1160 may move forward or rearward.

The gear connecting frame 1164 may be implemented in a cylindrical shape, but the present disclosure is not limited thereto, and the gear connecting frame 1164 may be implemented in various other shapes. The gear connecting frame 1164 may be implemented with a rigid material such as metal, aluminum, and carbon.

Figure 6:
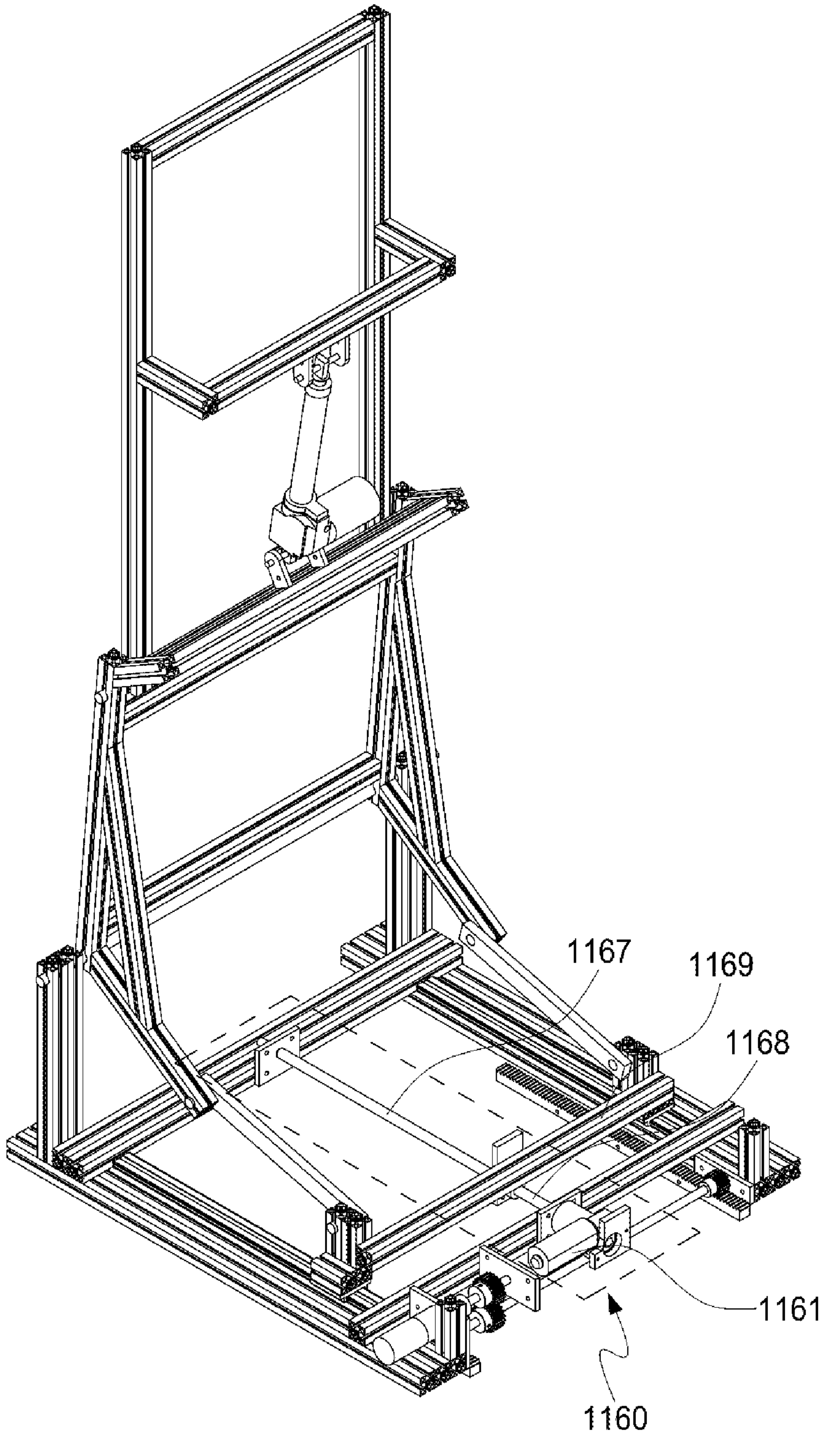
FIG. 6 is a view for describing a structure of the driving force providing part (1160) according to another embodiment of the present disclosure.

FIG. 6 is a view for describing the structure of the driving force providing part 1160 according to another embodiment of the present disclosure.

The driving force providing part 1160 may include the actuator 1161. In this case, the actuator may be implemented as a DC motor. The actuator 1161 may rotate a spiral rod 1167 connected to the actuator 1161. For example, the actuator 1161 may rotate the spiral rod 1167 in the first direction (for example, clockwise). Also, the actuator 1161 may rotate the spiral rod 1167 in the second direction (for example, counterclockwise).

When the spiral rod 1167 rotates, a spiral rod guide 1168 coupled to the spiral rod 1167 may move forward or rearward. For example, when the spiral rod 1167 rotates clockwise, the spiral rod guide 1168 may move forward, and when the spiral rod 1167 rotates counterclockwise, the spiral rod guide 1168 may move rearward. As another example, when the spiral rod 1167 rotates counterclockwise, the spiral rod guide 1168 may move forward, and when the spiral rod 1167 rotates clockwise, the spiral rod guide 1168 may move rearward.

The spiral rod guide 1168 may be a gear for power transmission. Also, the spiral rod guide 1168 may be a gearbox having a box-shaped frame in which various gears for power transmission are embedded. For example, the spiral rod guide 1168 may be a rotary gear engaged with the spiral rod 1167. Also, the spiral rod guide 1168 may be a gearbox including a rotary gear engaged with the spiral rod 1167.

The spiral rod guide 1168 may be connected to a moving auxiliary frame 1169. For example, since the spiral rod guide 1168 may be coupled to the moving auxiliary frame 1169, when the spiral rod guide 1168 moves, the moving auxiliary frame 1169 may also move together with the spiral rod guide 1168.

Since the moving auxiliary frame 1169 may move while in contact with an upper portion of the horizontal base frame 1114 due to the movement of the spiral rod guide 1168, and the moving auxiliary frame 1169 may be connected to the link sub-frame 1150, the link sub-frame 1150 may receive a pulling force or a pushing force due to the movement of the moving auxiliary frame 1169.

For example, when the moving auxiliary frame 1169 moves forward, a forward pushing force may be applied to the link sub-frame 1150. Also, when the moving auxiliary frame 1169 moves rearward, a rearward pulling force may be applied to the link sub-frame 1150.

According to an embodiment of the present disclosure, the back angle actuator 1180 may operate in conjunction with the driving force providing part 1160. For example, when the spiral rod 1167 rotates and the driving force providing part 1160 pulls the link sub-frame 1150 rearward, the length of the back angle actuator 1180 may shorten. As a result, the angle between the seat frame 1120 and the backrest frame 1130 may be increased, and the massage device 1000 may be transformed to the standing type.

Also, when the spiral rod 1167 rotates and the driving force providing part 1160 pushes the link sub-frame 1150 forward, the length of the back angle actuator 1180 may lengthen. As a result, the angle between the seat frame 1120 and the backrest frame 1130 may be decreased, and the massage device 1000 may be transformed to seating-type.

Figure 7:
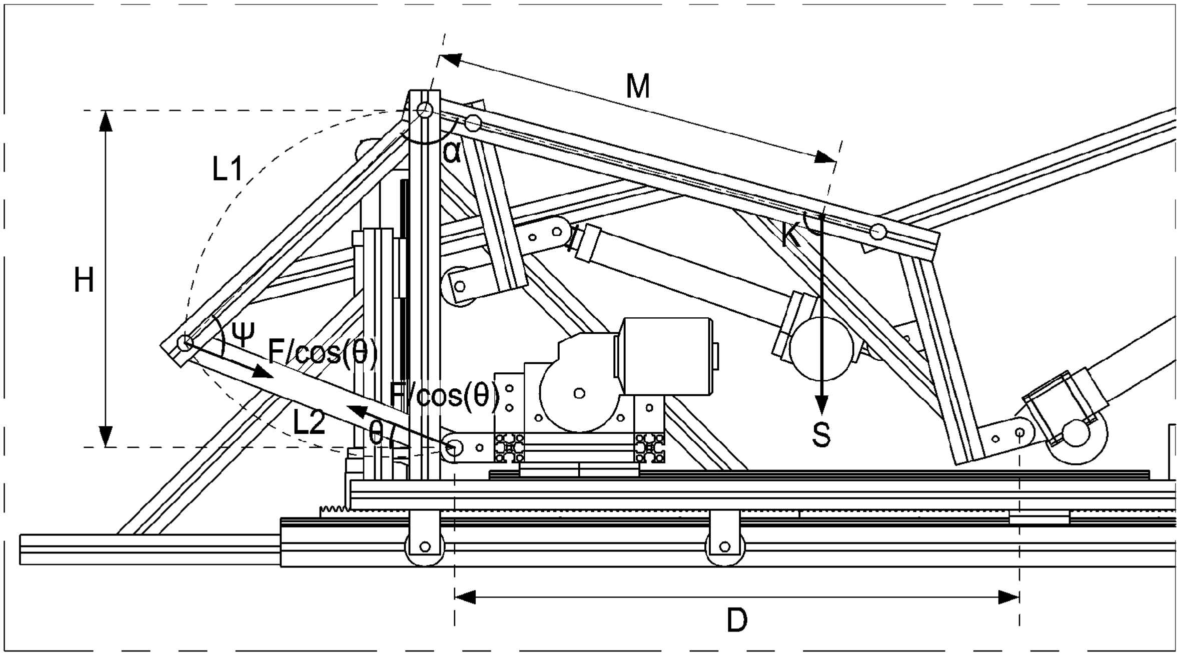
FIG. 7 is a view for describing a relationship between a link frame length and a link sub-frame length according to an embodiment of the present disclosure.

FIG. 7 is a view for describing a relationship between a link frame length and a link sub-frame length according to an embodiment of the present disclosure.

A length L1 of the link frame 1140 may be shorter than a length of a vertical height H from the horizontal base frame 1114 to the main rotating shaft.

Also, the length L1 of the link frame 1140 and a length L2 of the link sub-frame may be determined in consideration of the following calculation formula.

$$L1+L2\geq\sqrt{H^2+D^2} \tag{1}$$

In this case, D represents a range in which the driving force providing part 1160 is movable. For example, D may represent a range in which the pinion gear 1165 included in the driving force providing part 1160 is movable along the rack gear. As another example, D may represent a range in which the spiral rod guide 1168 included in the driving force providing part 1160 is movable.

In this case, even when the driving force providing part 1160 is disposed at the farthest possible position from the main rotating shaft within the range in which the driving force providing part 1160 is movable, an angle ψ between the link frame 1140 and the link sub-frame 1150 may be less than or equal to 180°.

Also, the length L1 of the link frame 1140 may be determined in further consideration of at least one of the following calculation formulas (2) to (4).

$$\frac{F}{\cos(\theta)}L1\sin(\phi)\geq S\times N\times M\times\sin(K^\circ) \tag{2}$$

$$L1\sin(165-\alpha)+L2\sin(\theta)=H \tag{3}$$

$$\psi=165-\alpha+\theta \tag{4}$$

Here, F represents the force that the driving force providing part provides, w represents the angle between the link frame and the link sub-frame, θ represents the angle between the link sub-frame and a horizontal base upper frame, α represents the angle between the seat frame and the link frame, S represents the weight applied to the massage device when the user is seated on the massage device, N represents gravitational acceleration, M represents the distance between the main rotating shaft and the center of mass when the user is seated on the massage device, and K represents the angle between the seat frame and the direction of the weight applied to the massage device. Also, H represents the distance from the main rotating shaft to a point of contact between the link sub-frame and the driving force providing part.

In this case, α, D, H, S, N, M, and K may be predetermined. For example, S may be predetermined as 200 kg, N may be predetermined as 9.8 $m/s^2$, M may be predetermined as 0.41 m, and K may be predetermined as 105°.

According to an embodiment of the present disclosure, the length of each of the one or more frames included in the massage device 1000 should be adjusted to prevent a problem from occurring in the massage device 1000 even when the user is seated on the massage device 1000. For example, the weight applied to the massage device when the user is seated on the massage device may correspond to a maximum of 200 kg. In this case, the center of mass of the massage device may be a point spaced 0.41 m apart from the main rotating shaft 1125. In this case, torque applied to the link frame 1140 due to the driving force providing part 1160 should be higher than or equal to torque applied to the seat frame 1120 due to the weight applied to the massage device. When the length L1 of the link frame and the length L2 of the link sub-frame satisfy the calculation formulas (1), (2), (3), and (4), the torque applied to the link frame 1140 due to the driving force providing part 1160 may be higher than or equal to the torque applied to the seat frame 1120 due to the weight applied to the massage device.

Figure 8:
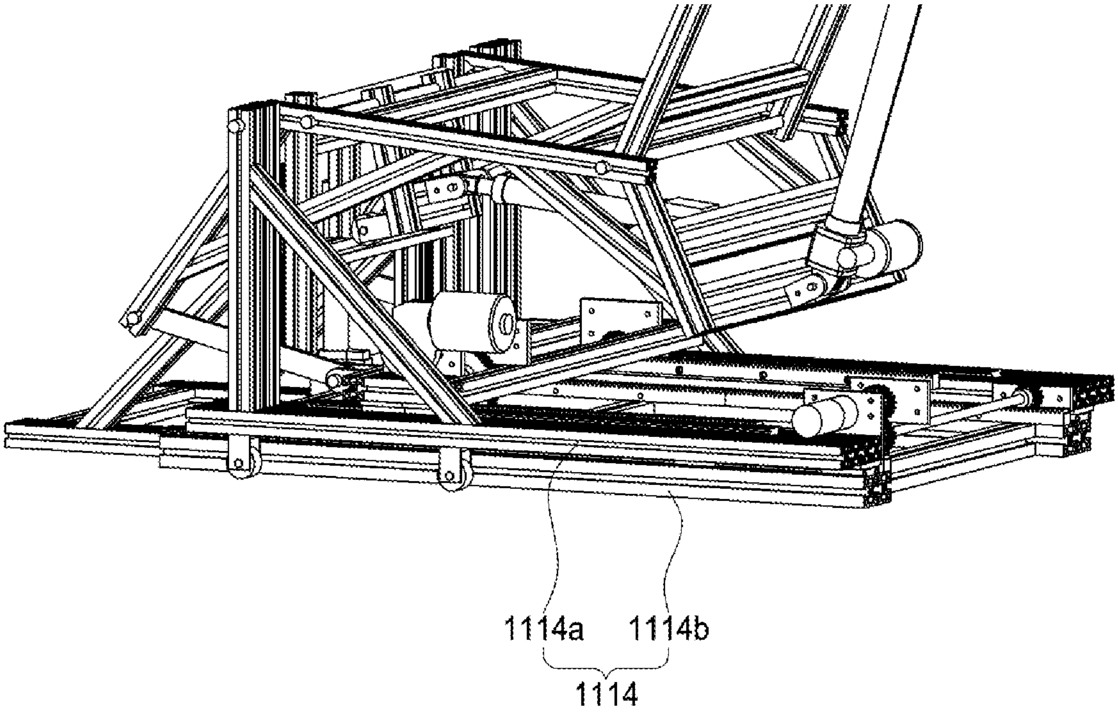
FIG. 8 is a view for describing an operation in which a horizontal base upper frame slides according to an embodiment of the present disclosure.

FIG. 8 is a view for describing an operation in which a horizontal base upper frame slides according to an embodiment of the present disclosure.

According to another embodiment of the present disclosure, the horizontal base frame 1114 may include a horizontal base upper frame **1114*a* and a horizontal base lower frame 1114*b***.

The horizontal base upper frame 1114*a* may support the vertical base frame 1112, and the horizontal base lower frame 1114*b* may come in contact with the ground. Also, the horizontal base upper frame 1114*a* may be disposed to come in contact with the horizontal base lower frame 1114*b*.

According to an embodiment of the present disclosure, the horizontal base upper frame 1114*a* may move along the horizontal base lower frame 1114*b*. For example, the horizontal base upper frame 1114*a* may slide forward or rearward along the horizontal base lower frame 1114*b*. In this case, the upper frame may be connected to the horizontal base upper frame 1114*a* and move according to the movement of the horizontal base upper frame 1114*a*.

For example, when the horizontal base upper frame 1114*a* moves forward, the upper frame may also move forward together, and when the horizontal base upper frame 1114*a* moves rearward, the upper frame may also move rearward together. Thus, sliding of the massage device 1000 may be allowed.

In more detail, a moving wheel may be provided on a lower portion of the horizontal base upper frame 1114*a* to allow the movement of the horizontal base upper frame 1114*a*. The moving wheel provided on the horizontal base upper frame 1114*a* may move along the ground to allow the forward movement or rearward movement of the horizontal base upper frame 1114*a*. According to another embodiment of the present disclosure, a guide member configured to guide the moving wheel may be provided on an upper portion of the horizontal base lower frame 1114*b*. The moving wheel provided on the horizontal base upper frame 1114*a* may move along the guide member provided on the horizontal base lower frame 1114*b* to allow the forward movement or rearward movement of the horizontal base upper frame 1114*a*.

According to another embodiment of the present disclosure, the massage device 1000 may not provide the sliding function, and in this case, the horizontal base frame 1114 may not be separated into the upper and lower frames.

Figure 9:
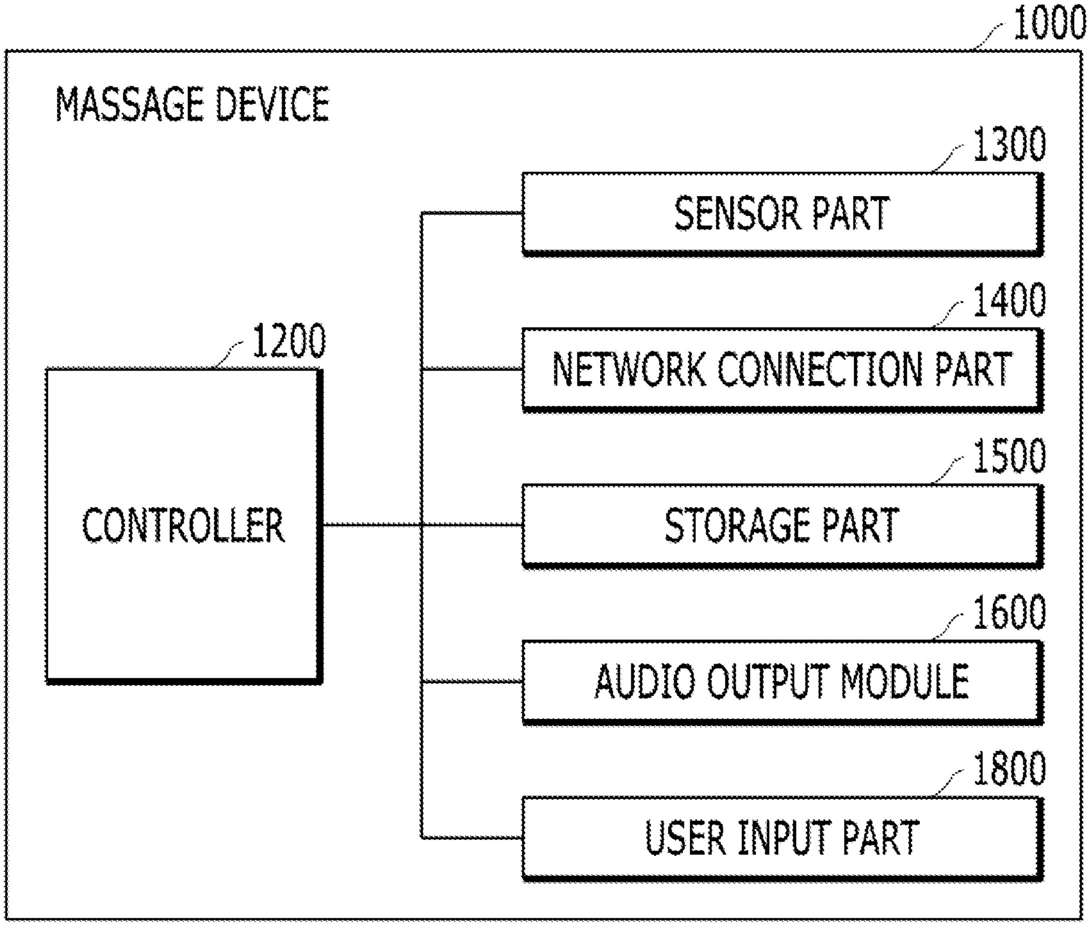
FIG. 9 is a view for describing elements included in the massage device according to an embodiment of the present disclosure.

FIG. 9 is a view for describing elements included in the massage device according to an embodiment of the present disclosure.

According to an embodiment of the present disclosure, the massage device 1000 may include at least one of a controller 1200, a sensor part 1300, the user input part 1800, the audio output module 1600, and a network connection part 1400.

The controller 1200 may control the operation of the massage device 1000. The controller 1200 may be implemented with a single processor or implemented with a plurality of processors. In a case in which the controller 1200 is implemented with a plurality of processors, at least some of the plurality of processors may be located to be physically spaced apart at a certain distance. The controller 1200 is not limited thereto and may be implemented in various other ways.

According to an embodiment of the present disclosure, the controller 1200 may control the operation of the massage device 1000. For example, the massage device 1000 may include a plurality of actuators, and the controller 1200 may control the operation of the plurality of actuators to control the operation of the massage device 1000. For example, the massage device 1000 may include a massage module 1700 moving actuator, at least one actuator included in the massage module, and at least one of a back angle actuator, a leg angle actuator, a foot massage actuator, a leg length adjusting actuator, and a sliding actuator, and the controller 1200 may control the actuators to control the operation of the massage device 1000.

The massage module moving actuator is an actuator that allows vertical movement of the massage module 1700, and the massage module 1700 may move along the rack gear due to the operation of the massage module 1700 moving actuator.

The back angle actuator is an actuator that adjusts an angle of a portion of the massage device 1000 that comes in contact with the user's back, and the back angle of the massage device 1000 may be adjusted due to the operation of the back angle actuator.

The leg angle actuator is an actuator that adjusts an angle of the leg massage part 300 of the massage device 1000, and an angle between the leg massage part 300 and the body massage part 100 may be adjusted due to the operation of the leg angle actuator.

The foot massage actuator refers to an actuator that operates a foot massage module included in the leg massage part 300. The massage device 1000 may utilize the foot massage actuator to provide a foot massage to the user.

At least one actuator may be included in the massage module 1700, and the controller 1200 may operate the at least one actuator to provide various massage operations. For example, the controller 1200 may operate at least one actuator included in the massage module 1700 to provide a tapping massage, a rubbing massage, and the like, but the present disclosure is not limited thereto, and the controller 1200 may provide various other massage operations.

The leg length adjusting actuator refers to an actuator that adjusts the length of the leg massage part 300. For example, the controller 1200 may utilize the leg length adjusting actuator to adjust the length of the leg massage part 300 to suit each user, and as a result, a user may receive a massage that is suitable for his or her body frame.

The sliding actuator allows sliding of the massage device 1000. For example, the horizontal base upper frame 1114*a* may move forward or rearward due to the operation of the sliding actuator, and as a result, the upper frame connected to the horizontal base upper frame 1114*a* also may move forward or rearward.

The sensor part 1300 may use at least one sensor to acquire various pieces of information. Examples of the sensor may include a pressure sensor, an infrared sensor, a light emitting diode (LED) sensor, and the like, but are not limited thereto.

Also, the sensor part 1300 may include a biometric information acquisition sensor. The biometric information acquisition sensor may acquire fingerprint information, facial information, voice information, iris information, body weight information, electrocardiogram information, and the like, but the present disclosure is not limited thereto, and the biometric information acquisition sensor may acquire various other pieces of biometric information.

According to another embodiment of the present disclosure, the massage device 1000 may sense an area in contact with the user and/or a location of the area in contact with the user through sensors. Also, the massage device 1000 may acquire shoulder position information of the user through the sensor part 1300. Also, the massage device 1000 may provide a customized massage on the basis of the acquired information. For example, in the case in which the massage device 1000 provides a shoulder massage, the massage device 1000 may recognize the positions of the user's shoulders on the basis of information acquired through the sensor part 1300 and provide a shoulder massage to the user according to the result of recognition.

The user input part 1800 may receive a command related to operational control of the massage device 1000 from the user, and the user input part 1800 may be implemented in various forms. For example, the user input part 1800 may be provided in the form of a user input module (for example, a remote controller or the like) to the massage device 1000. Also, the user input part 1800 may be integrally provided with the body massage part 100 or integrally provided with the leg massage part 300, but the present disclosure is not limited thereto.

The massage device 1000 may acquire various commands from the user through the user input part 1800. For example, the massage device 1000 may receive an arbitrary command relating to selection of massage module, selection of massage type, selection of massage intensity, selection of massage time, selection of massage site, selection relating to location and operation of the body massage part 100, selection relating to turning power of the massage device 1000 on or off, selection relating to whether to use warming function, selection relating to sound source playback, and the like, but the present disclosure is not limited thereto.

According to another embodiment of the present disclosure, the user input part 1800 may have, according to a function preset by the user, a function preset by itself, or the like, hot key buttons, and/or selection buttons for executing direction selection, cancellation, and input. The user input part 1800 may be implemented with a key pad, a dome switch, a touch pad (static pressure/capacitive), a jog wheel, a jog switch, and the like, but the present disclosure is not limited thereto. Also, the user input part 1800 may acquire a command through the user's speech on the basis of a voice recognition technology.

According to an embodiment of the present disclosure, the user input part 1800 may include a display configured to display an operational status of the massage device 1000, the current condition of the user, or the like. In this case, the display may be at least one of a liquid crystal display (LCD), a thin film transistor-liquid crystal display (TFT-LCD), an organic light-emitting diode (OLED) display, a flexible display, and a 3D display, but the present disclosure is not limited thereto.

The audio output module 1600 may provide an audio output in an arbitrary form to the user. For example, the audio output module 1600 may output a sound source and/or a binaural beat, which is optimized for a massage pattern provided from the massage device 1000, to the user and provide brain stimulation to the user. The audio output module 1600 may output an acoustic signal which is received through a network (not illustrated) or stored in an internal/external storage medium (not illustrated). For example, through network connection (for example, Bluetooth connection etc.) with a user terminal 2000, the audio output module 1600 may output a sound source according to control of the user terminal 2000. Also, the audio output module 1600 may output an acoustic signal in an arbitrary form that is generated in relation to the operation of the massage device 1000.

The massage device 1000 according to an embodiment of the present disclosure may include the network connection part 1400. The network connection part 1400 may perform communication with a module inside the massage device 1000, an external massage device, and/or the user terminal 2000 through a network in an arbitrary form. The network connection part 1400 may include a wired/wireless connection module for network connection. For example, as a wireless connection technology, wireless LAN (WLAN) (Wi-Fi), wireless broadband (WiBro), World Interoperability for Microwave Access (WiMAX), High Speed Downlink Packet Access (HSDPA), and the like may be used. For example, as a wired connection technology, x Digital Subscriber Line (xDSL), Fiber to the Home (FTTH), Power Line Communication (PLC), and the like may be used. Also, the network connection part may include a short-range communication module and transmit and receive data to and from an arbitrary device/terminal located a short distance away. For example, as a short-range communication technology, Bluetooth, Radio Frequency Identification (RFID), Infrared Data Association (IrDA), Ultra Wideband (UWB), ZigBee, and the like may be used, but the present disclosure is not limited thereto.

A storage part 1500 may store various pieces of information relating to the massage device 1000. For example, the storage part 1500 may include massage control information or include personal authentication information, but the present disclosure is not limited thereto.

The storage part 1500 may be implemented through a nonvolatile storage medium that may continuously store arbitrary data. For example, the storage part 1500 may include a disk, an optical disk, and a magneto-optical storage device and also include a flash memory and/or a storage device based on a battery-backup memory, but the present disclosure is not limited thereto.

Also, the storage part 1500 may include a memory. The memory may be a main storage device directly accessed by a processor and may refer to a volatile storage device in which stored information is erased instantaneously when the power is turned off, such as a random access memory (RAM) like a dynamic random access memory (DRAM) and a static random access memory (SRAM), but the memory is not limited thereto. The memory may be operated by the controller 1200.

Figure 10:
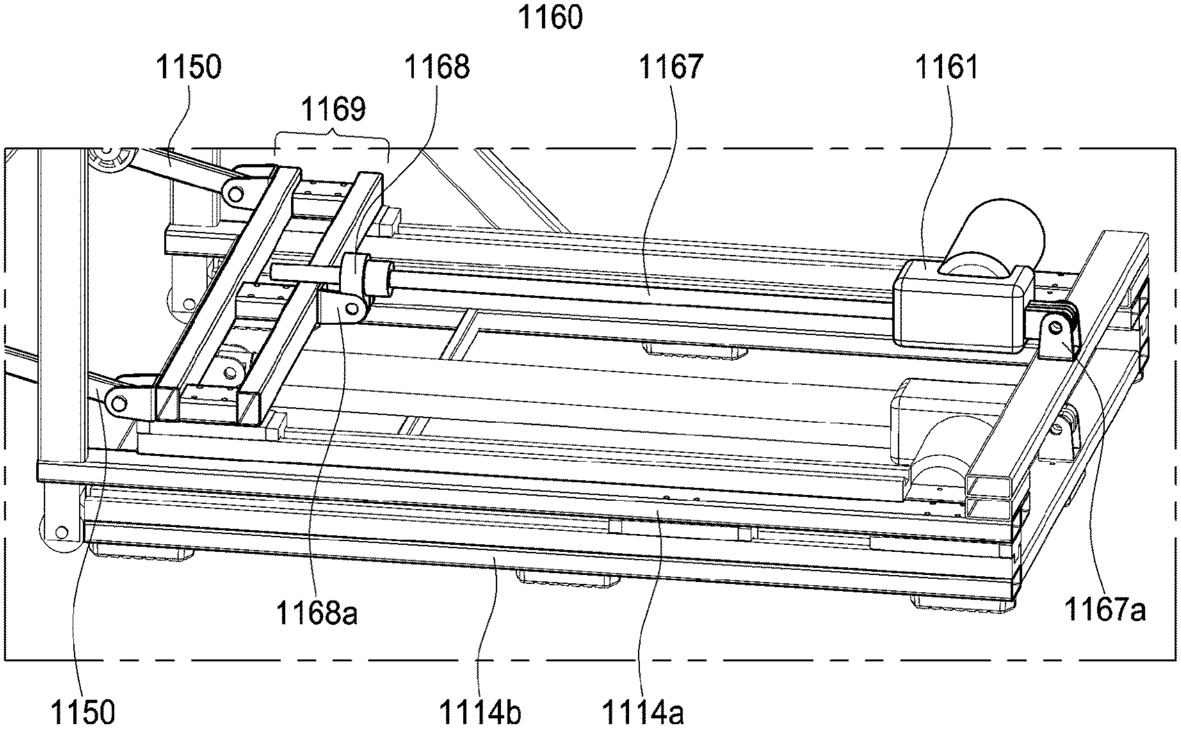
FIG. 10 is a view for describing an operation of the driving force providing part according to another embodiment of the present disclosure.

FIG. 10 is a view for describing an operation of the driving force providing part according to another embodiment of the present disclosure.

The driving force providing part 1160 may include the actuator 1161. In this case, the actuator may be implemented as a DC motor. The actuator 1161 may rotate the spiral rod 1167 connected to the actuator 1161. For example, the actuator 1161 may rotate the spiral rod 1167 in the first direction (for example, clockwise). Also, the actuator 1161 may rotate the spiral rod 1167 in the second direction (for example, counterclockwise).

When the spiral rod 1167 rotates, the spiral rod guide 1168 coupled to the spiral rod 1167 may move forward or rearward. For example, when the spiral rod 1167 rotates clockwise, the spiral rod guide 1168 may move forward, and when the spiral rod 1167 rotates counterclockwise, the spiral rod guide 1168 may move rearward. As another example, when the spiral rod 1167 rotates counterclockwise, the spiral rod guide 1168 may move forward, and when the spiral rod 1167 rotates clockwise, the spiral rod guide 1168 may move rearward.

The spiral rod guide 1168 may be a gear for power transmission. Also, the spiral rod guide 1168 may be a gearbox having a box-shaped frame in which various gears for power transmission are embedded. For example, the spiral rod guide 1168 may be a rotary gear engaged with the spiral rod 1167. Also, the spiral rod guide 1168 may be a gearbox including a rotary gear engaged with the spiral rod 1167.

The spiral rod guide 1168 may be connected to the moving auxiliary frame 1169. For example, since the spiral rod guide 1168 may be coupled to the moving auxiliary frame 1169, when the spiral rod guide 1168 moves, the moving auxiliary frame 1169 may also move together with the spiral rod guide 1168.

In this case, a connecting auxiliary hinge part 1168*a* may be provided between the spiral rod guide 1168 and the moving auxiliary frame 1169, and the spiral rod guide 1168 and the moving auxiliary frame 1169 may be coupled through the connecting auxiliary hinge part 1168*a*.

Since the moving auxiliary frame 1169 may move while in contact with the upper portion of the horizontal base frame 1114 due to the movement of the spiral rod guide 1168, and the moving auxiliary frame 1169 may be connected to the link sub-frame 1150, the link sub-frame 1150 may receive a pulling force or a pushing force due to the movement of the moving auxiliary frame 1169.

For example, when the moving auxiliary frame 1169 moves forward, a forward pushing force may be applied to the link sub-frame 1150. Also, when the moving auxiliary frame 1169 moves rearward, a rearward pulling force may be applied to the link sub-frame 1150.

According to an embodiment of the present disclosure, since a rail member may be provided on an upper surface of the horizontal base upper frame 1114*a*, and a guide member engaged with the rail member may be provided on a lower portion of the moving auxiliary frame 1169, the moving auxiliary frame 1169 may move along the rail member.

In this case, a hinge part 1167*a* provided on one end of the spiral rod 1167 and the connecting auxiliary hinge part 1168*a*, which is connected to the spiral rod guide 1168, may facilitate the arrangement of the spiral rod 1167 and the rail member, which is provided on the upper surface of the horizontal base upper frame 1114*a*. Specifically, it is preferable that the rail member, which is provided on the upper surface of the horizontal base upper frame 1114*a*, and the spiral rod 1167 are provided to be parallel to each other, but due to practical difficulties, a slight error may occur, and the rail member and the spiral rod 1167 may not be completely parallel. In this case, even when the error occurs, the hinge part 1167*a* and the connecting auxiliary hinge part 1168*a* may allow the spiral rod 1167 to be arranged adaptively according to the error.

Also, the other end of the spiral rod 1167 may not be fixed and may be allowed to move to some extent so that the spiral rod 1167 may be arranged adaptively.

Figure 11:
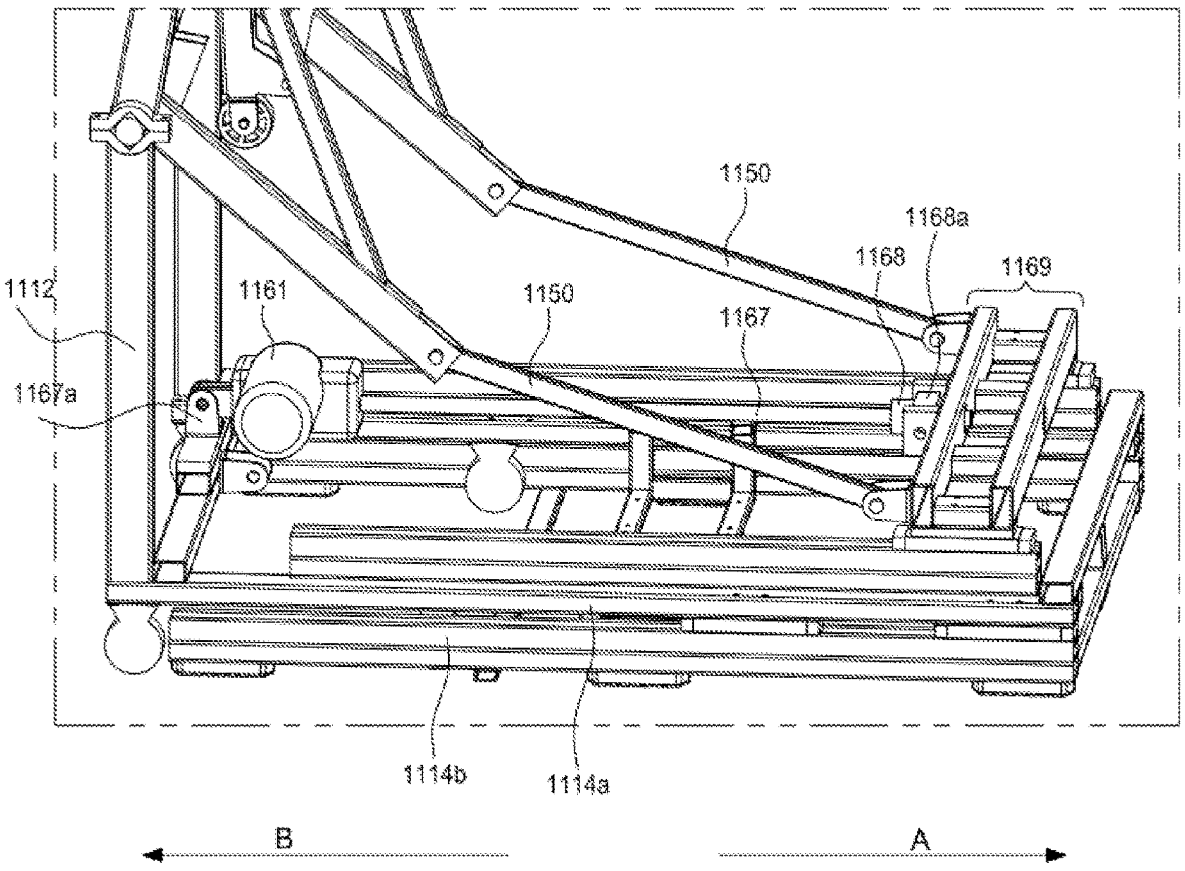
FIG. 11 is a view for describing a structure of the driving force providing part according to another embodiment of the present disclosure.

FIG. 11 is a view for describing a structure of the driving force providing part according to another embodiment of the present disclosure.

The driving force providing part 1160 may include the actuator 1161. In this case, the actuator may be implemented as a DC motor. The actuator 1161 may rotate the spiral rod 1167 connected to the actuator 1161. For example, the actuator 1161 may rotate the spiral rod 1167 in the first direction (for example, clockwise). Also, the actuator 1161 may rotate the spiral rod 1167 in the second direction (for example, counterclockwise).

In this case, the actuator 1161 may be disposed to be leaned forward (B). Since the actuator 1161 is disposed to be leaned forward, power transmission may be efficiently performed.

A through-hole may be provided in the moving auxiliary frame 1169, and the spiral rod 1167 may pass through the moving auxiliary frame 1169 via the through-hole. When the moving auxiliary frame 1169 moves forward (B) or moves rearward (A), the spiral rod 1167 may pass through the moving auxiliary frame 1169 via the through-hole, which is provided in the moving auxiliary frame 1169, so that the spiral rod 1167 and the horizontal base upper frame 1114*a* remain parallel to each other. As a result, the durability of the massage device 1000 may be ensured.

Also, since the connecting auxiliary hinge part 1168*a* is present between the spiral rod guide 1168 and the moving auxiliary frame 1169, the arrangement of the spiral rod 1167 and the rail member, which is provided on the upper surface of the horizontal base upper frame 1114*a*, may be facilitated. Specifically, it is preferable that the rail member, which is provided on the upper surface of the horizontal base upper frame 1114*a*, and the spiral rod 1167 are provided to be parallel to each other, but due to practical difficulties, a slight error may occur, and the rail member and the spiral rod 1167 may not be completely parallel. In this case, even when the error occurs, the hinge part 1167*a* and the connecting auxiliary hinge part 1168*a* may allow the spiral rod 1167 to be arranged adaptively according to the error.

Figure 12:
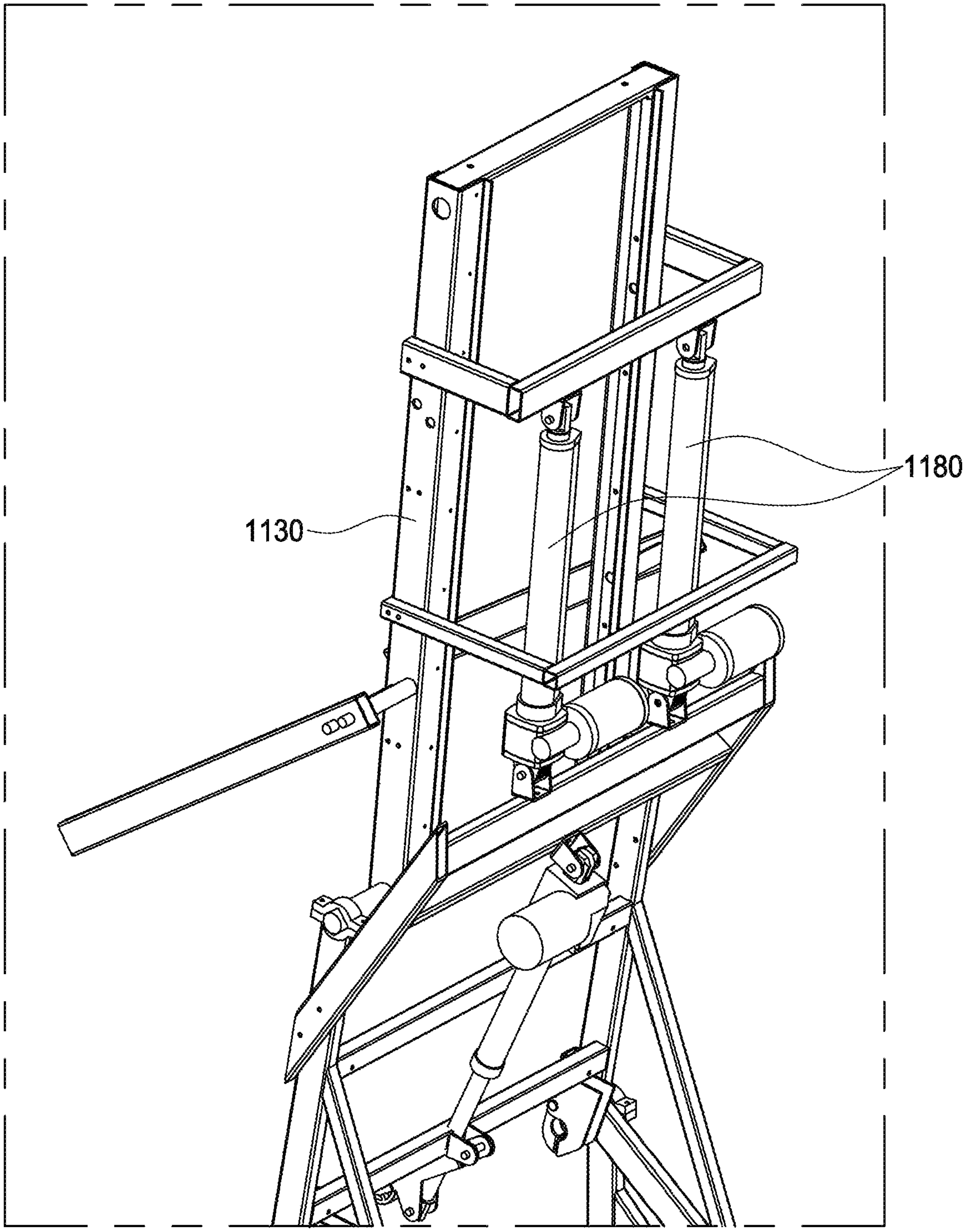
FIG. 12 is a view for describing an operation of a back angle actuator according to another embodiment of the present disclosure.

FIG. 12 is a view for describing an operation of a back angle actuator according to another embodiment of the present disclosure.

The massage device 1000 may include the back angle actuator 1180, and the angle between the seat frame 1120 and the backrest frame 1130 may be changed due to the operation of the back angle actuator 1180. Specifically, when the back angle actuator 1180 is driven from the short state to the long state, the backrest frame 1130 may rotate in the first direction (for example, counterclockwise) about the sub-rotating shaft, and thus, the angle between the seat frame 1120 and the backrest frame 1130 may be decreased. Also, when the back angle actuator 1180 is driven from the long state to the short state, the backrest frame 1130 may rotate in the second direction (for example, clockwise) about the sub-rotating shaft, and thus, the angle between the seat frame 1120 and the backrest frame 1130 may be increased.

In this case, the massage device 1000 may include a plurality of back angle actuators 1180. For example, the massage device 1000 may include two back angle actuators 1180 arranged parallel to each other. In this way, due to the back angle actuators 1180, the force applied to the backrest frame 1130 may be increased, and as a result, the angle between the backrest frame 1130 and the seat frame 1120 may be easily changed.

Figure 13:
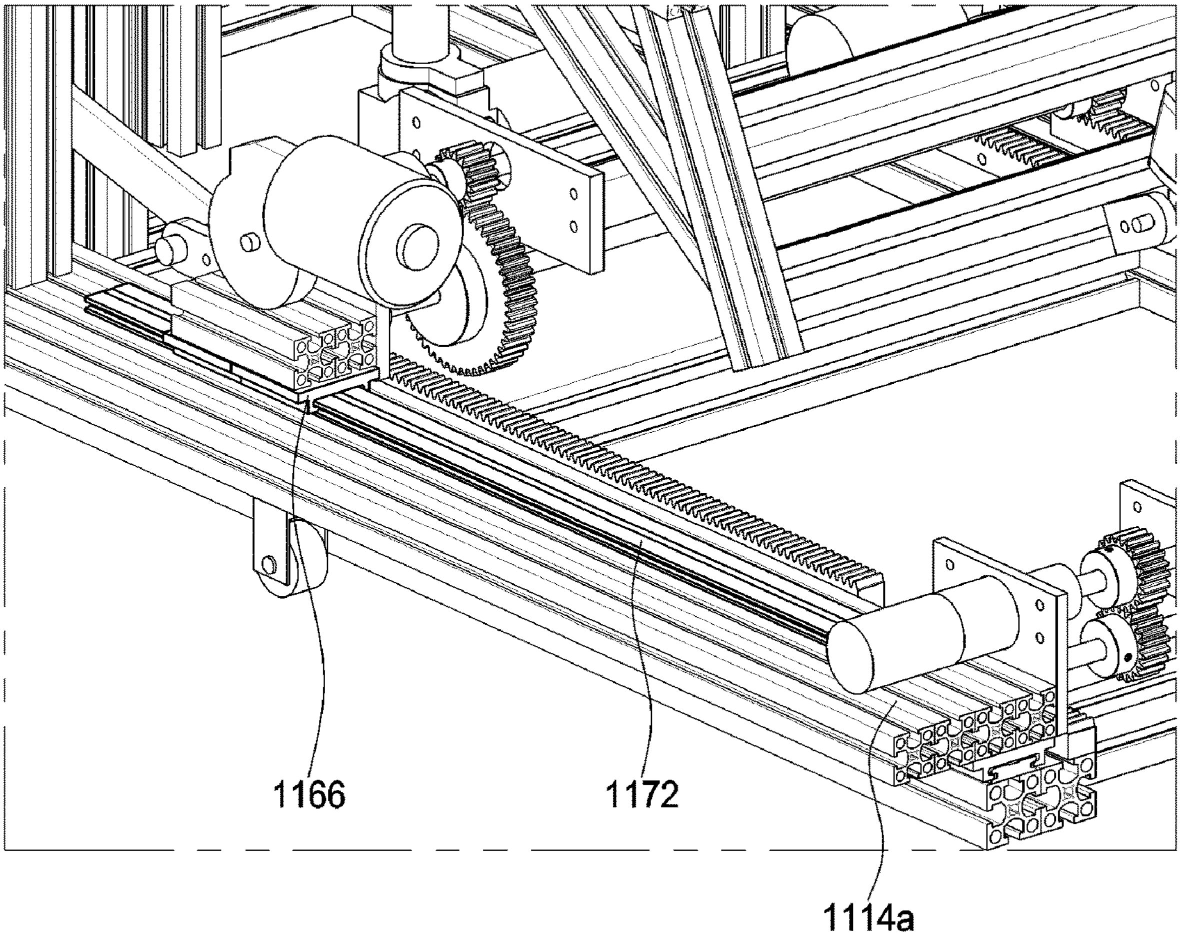
FIG. 13 is a view for describing a rail block of the driving force providing part according to an embodiment of the present disclosure.

FIG. 13 is a view for describing a rail block of the driving force providing part according to an embodiment of the present disclosure.

According to an embodiment of the present disclosure, the driving force providing part 1160 may further include a rail block 1166. The rail block 1166 refers to a component that moves along a guide rail 1172 provided on the base frame 1110 to guide the forward movement or rearward movement of the driving force providing part 1160.

According to an embodiment of the present disclosure, the guide rail 1172 may be disposed to be in contact with the upper surface of the horizontal base upper frame 1114*a*. At least a portion of the guide rail 1172 may protrude upward, and the protruding portion may be recessed into the rail block 1166.

In another embodiment, at least a portion of an upper surface of the guide rail 1172 may be depressed, and at least a portion of the rail block 1166 may be recessed into the depressed portion.

Description of the proposed embodiments has been provided above to allow anyone of ordinary skill in the art to use or embody the present disclosure. It should be apparent to those of ordinary skill in the art that various modifications may be made to the embodiments, and general principles defined herein may be applied to other embodiments without departing from the scope of the present disclosure. Therefore, the present disclosure is not limited to the embodiments proposed herein and should be interpreted as having the broadest possible range that is consistent with the principles and novel features proposed herein.

The invention claimed is:

1. A massage device comprising:

a seat frame configured to support buttocks of a user;

a link frame of which one end is connected to one end of the seat frame; and a link sub-frame connected to the other end of the link frame and disposed between the link frame and a driving force providing part, wherein an angle between the link frame and the seat frame is maintained at a predetermined angle, and an angle between the link frame and the link sub-frame changes according to movement of the driving force providing part, and wherein the seat frame and the link frame rotate together about a main rotating shaft and the main rotating shaft is provided on at least a portion of the seat frame.

2. The massage device of claim 1, further comprising a backrest frame configured to support the user's back and connected to the other end of the seat frame, wherein a sub-rotating shaft is disposed on at least a portion of the seat frame, and the backrest frame rotates about the sub-rotating shaft.

3. The massage device of claim 1, further comprising the driving force providing part configured to provide a rotational force to the seat frame and the link frame.

4. The massage device of claim 3, wherein the driving force providing part includes:

an actuator configured to provide a driving force;

at least one link gear connected to the actuator to change a magnitude of the driving force generated by the actuator; and at least one pinion gear connected to the at least one link gear.

5. The massage device of claim 4, wherein the driving force providing part further includes a gear connecting frame configured to connect the at least one link gear and the at least one pinion gear.

6. The massage device of claim 4, further comprising a base frame configured to support the seat frame, wherein at least one rack gear is provided on at least a portion of the base frame, and the at least one pinion gear is engaged with the rack gear.

7. The massage device of claim 1, further comprising:

a vertical base frame configured to support the seat frame; and a horizontal base frame configured to support the vertical base frame and come in contact with the ground, wherein a rack gear is provided on at least a portion of the horizontal base frame.

8. The massage device of claim 7, wherein the horizontal base frame includes:

a horizontal base upper frame configured to support the vertical base frame and come in contact with a base lower frame; and a horizontal base lower frame configured to come in contact with the ground and support the horizontal base upper frame, wherein a rack gear is provided on at least a portion of the horizontal base upper frame.

9. The massage device of claim 8, wherein the horizontal base upper frame slides on an upper portion of the horizontal base lower frame.

10. The massage device of claim 1, wherein a length (L1) of the link frame is shorter than a length of a vertical height (H) from a horizontal base frame to the main rotating shaft.

11. The massage device of claim 10, wherein the length (L1) of the link frame and a length (L2) of the link sub-frame are determined in consideration of the following calculation formula, $$L1+L2\geq\sqrt{H^2+D^2}, \tag{1}$$

wherein D represents a range in which a pinion gear included in the driving force providing part is movable along a rack gear, and H represents a distance from the main rotating shaft to a point of contact between the link sub-frame and the driving force providing part.

12. The massage device of claim 11, wherein the length (L1) of the link frame is determined in further consideration of the following calculation formulas (2) to (4):

$$\frac{F}{\cos(\theta)}L1\sin(\phi) \geq S \times N \times M \times \sin(K^\circ) \tag{2}$$

$$L1\sin(165-\alpha) + L2\sin(\theta) = H \tag{3}$$

$$\psi = 165 - \alpha + \theta, \tag{4}$$

wherein F represents a force that the driving force providing part provides, ψ represents an angle between the link frame and the link sub-frame, θ represents an angle between the link sub-frame and a horizontal base upper frame, a represents an angle between the seat frame and the link frame, S represents a weight applied to the massage device when a user is seated on the massage device, N represents gravitational acceleration, M represents a distance between the main rotating shaft and the center of mass when the user is seated on the massage device, and K represents an angle between the seat frame and a direction of the weight applied to the massage device, and a, D, H, S, N, M, and K are predetermined.

13. The massage device of claim 12, wherein S is predetermined as 200 kg, N is predetermined as 9.8 m/s$^2$, M is predetermined as 0.41 m, and K is predetermined as 105°.

14. The massage device of claim 3, wherein the driving force providing part includes:

an actuator configured to provide a driving force;

a spiral rod connected to the actuator to rotate due to operation of the actuator;

a spiral rod guide coupled to the spiral rod to move forward or rearward due to the rotation of the spiral rod; and a moving auxiliary frame connected to the spiral rod guide to move forward or rearward together with the spiral rod guide, wherein the link sub-frame receives a forward force or a rearward force due to movement of the moving auxiliary frame.

15. The massage device of claim 2, wherein an angle between the backrest frame and the seat frame is configured to adjust by a rotation of the backrest frame about the sub-rotating shaft, and wherein the message device is configured to switch between a seating mode in which the angle between the backrest frame and the seat frame is reduced, allowing a user to seat on the seat frame and a standing mode in which the angle between the backrest frame and the seat frame is increased, allowing the user to stand to ride on the message device.

16. The message device of claim 15, further comprising a back angle actuator connected between the backrest frame and the seat frame and configured to rotate the backrest frame about the sub-rotating shaft, wherein the back angle actuator operates together with the driving force providing part to switch between the seating mode and the standing mode.

* * * * *